United States Patent [19]

Hashimoto

[11] Patent Number: 5,191,488
[45] Date of Patent: Mar. 2, 1993

[54] AUDIO VISUAL DEVICE USING AN ENDLESS VIDEO TAPE

[75] Inventor: Kazuo Hashimoto, Tokyo, Japan

[73] Assignee: Hashimoto Corporation, Tokyo, Japan

[21] Appl. No.: 588,984

[22] Filed: Sep. 26, 1990

[30] Foreign Application Priority Data

Sep. 29, 1989 [JP] Japan .................. 1-254425

[51] Int. Cl.$^5$ .................. G11B 15/04; G11B 5/86; G11B 27/02
[52] U.S. Cl. .................. 360/60; 360/15; 360/13
[58] Field of Search .................. 360/15, 60, 13; 358/311

[56] References Cited

U.S. PATENT DOCUMENTS 4,618,895 10/1986 Wright .................. 360/15

FOREIGN PATENT DOCUMENTS 59-8153 1/1984 Japan .

Primary Examiner—Aristotelis Psitos
Assistant Examiner—Won Tae C. Kim
Attorney, Agent, or Firm—Lowe, Price, LeBlanc & Becker

[57] ABSTRACT

An audio visual apparatus of the invention has a standard cassette tape (T-2) having record-prevention tabs and an endless video cassette tape (T-1). When the cassettes are installed in two VCR units, respectively and a power switch is turned on, the T-1 and T-2 tapes are set to a recording mode and start recording a TV program. When a remote control button is pressed once, the T-2 tape continues recording while the T-1 tape is set to a playback mode in which video information from a TV is allowed to be monitored endlessly. When the remote control button is pressed once again, the T-1 tape is brought back to the recording mode. A series of the actions can be repeated. On the other hand, when an already recorded cassette tape with tape ends not having record-prevention tabs is installed as a T-2 tape, the T-2 tape is set to a playback mode while a T-1 tape is set to a recording mode, simultaneously while a power switch is turned on so that the T-1 tape records the video information of the T-2 tape. When a remote control button is pressed once, the T-1 tape is set to an endless playback mode while the T-2 tape stops its playback to thereby allow said T-1 tape to be played back endlessly on the TV screen for purposes of repeated learning. When the remote control button is pressed once again after the learning has been completed, the T-2 tape continues its automatic playback while the T-1 tape records the video information of the T-2 tape endlessly. A series of the actions can be repeated according to manipulation of the remote control button.

5 Claims, 2 Drawing Sheets

AUDIO VISUAL DEVICE USING AN ENDLESS VIDEO TAPE

TECHNICAL FIELD

This invention relates to a video apparatus for learning, incorporating two video tapes and a television set.

BACKGROUND ART

The prior art includes an endless video tape that has been developed by the applicant and disclosed in Japanese Patent Publication No. 39515/1987, and a video recording and playback device using the above endless video tape disclosed in Japanese Patent Laid-Open No. 66281/1986.

The above-mentioned endless video tape developed by the applicant allows its user to play back his desired portion recorded on the tape repeatedly as many times as wished, while watching television or playing back a normal video tape with tape ends. However, such an operation has heretofore been performed by an assemblage of commercially available television sets and VCRs or the like that are not integrated as a system, and therefore, it was quite difficult for a general user to operate them properly to make best use of the features of the endless video tape.

SUMMARY OF THE INVENTION

This invention attempts to overcome the above problem by providing a means, which consists of a set of systems that integrates two tape decks and a television set with a separate remote control box. This device achieves the simplest possible form in both operation and construction from the human engineering viewpoint and provides better practical usefulness that accommodates various user needs such as seeking to operate it from their bed; by elderly users, in old people's homes and in the dark. The remote control box comprising a power switch and a remote control button is designed as simply as possible, and the device can be operated by merely pressing a single button of this remote control box.

DESCRIPTION OF THE PREFERRED EMBODIMENT

The structure and function of an embodiment of this invention will next be described.

Figure 1:
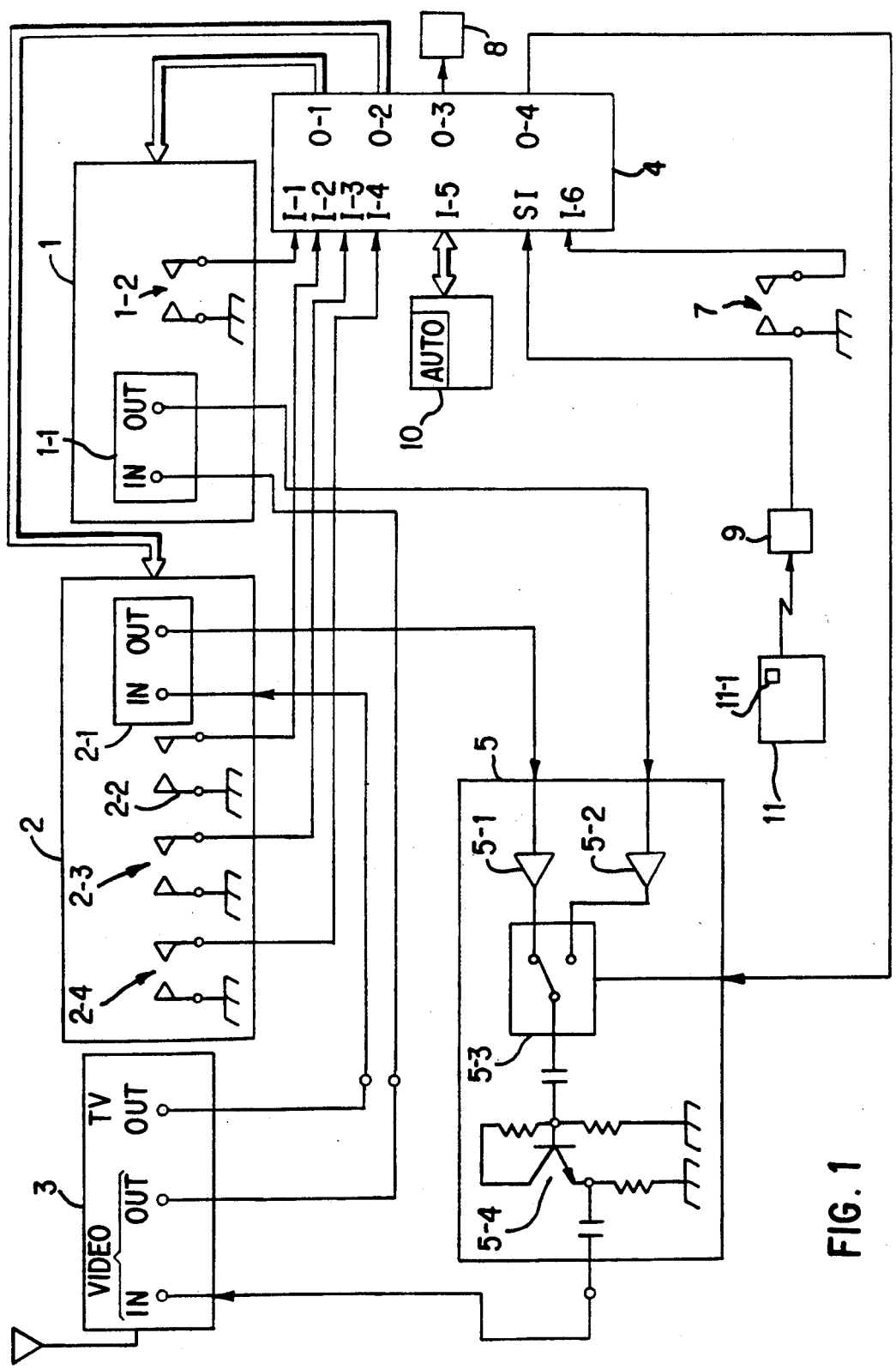
FIG. 1 is a block diagram showing an embodiment of the invention.

FIG. 1 is a circuit diagram of the embodiment of this invention. A VCR 1 for an endless video tape T-1 (not shown) has a deck 1—1 for the VCR 1, where "IN" and "OUT" are video input and output terminals, respectively; and a cassette switch 1-2 for detecting insertion of a cassette containing the endless video tape T-1. A video tape recorder 2 for a standard video tape T-2 (not shown) includes a deck 2-1 where "IN" and "OUT" are video input and output terminals, respectively; a cassette switch 2—2 for detecting insertion of a cassette containing the standard video tape T-2; a tab switch 2-3 for detecting absence of tabs provided for protection against erroneous erasure of information recorded on the tape in the cassette; and a camera switch 2-4 for detecting connection of a camera or a video movie. A television set (TV) 3 has a video input terminal, a video output terminal (monitor terminal), and a TV output terminal. Descriptions of the audio signal circuits for the VCR 1, VCR 2, and TV 3 are omitted because those of the video signals may likewise apply thereto.

A CPU 4 (microprocessor) includes input ports 1—1 to 1-5; output ports 0-1 to 0-4; and serial signal input port S1. A video switching circuit 5 switches a video signal from the VCR 1 or VCR 2 to supply the switched signal to the TV 3, and includes amplifiers 5-1 and 5-2; an analog switch 5-3 whose connection is switched depending on the output from the output port 0-4 of the CPU 4; and a transistor 5-4.

Reference numeral 7 denotes a power switch; 8, an alarm device for issuing an alarm sound in response to a command from the output port .0-3; 9, an infrared sensor for receiving infrared light from a remote control box 11. The remote control box 11 has a remote control button 11-1.

Figure 2:
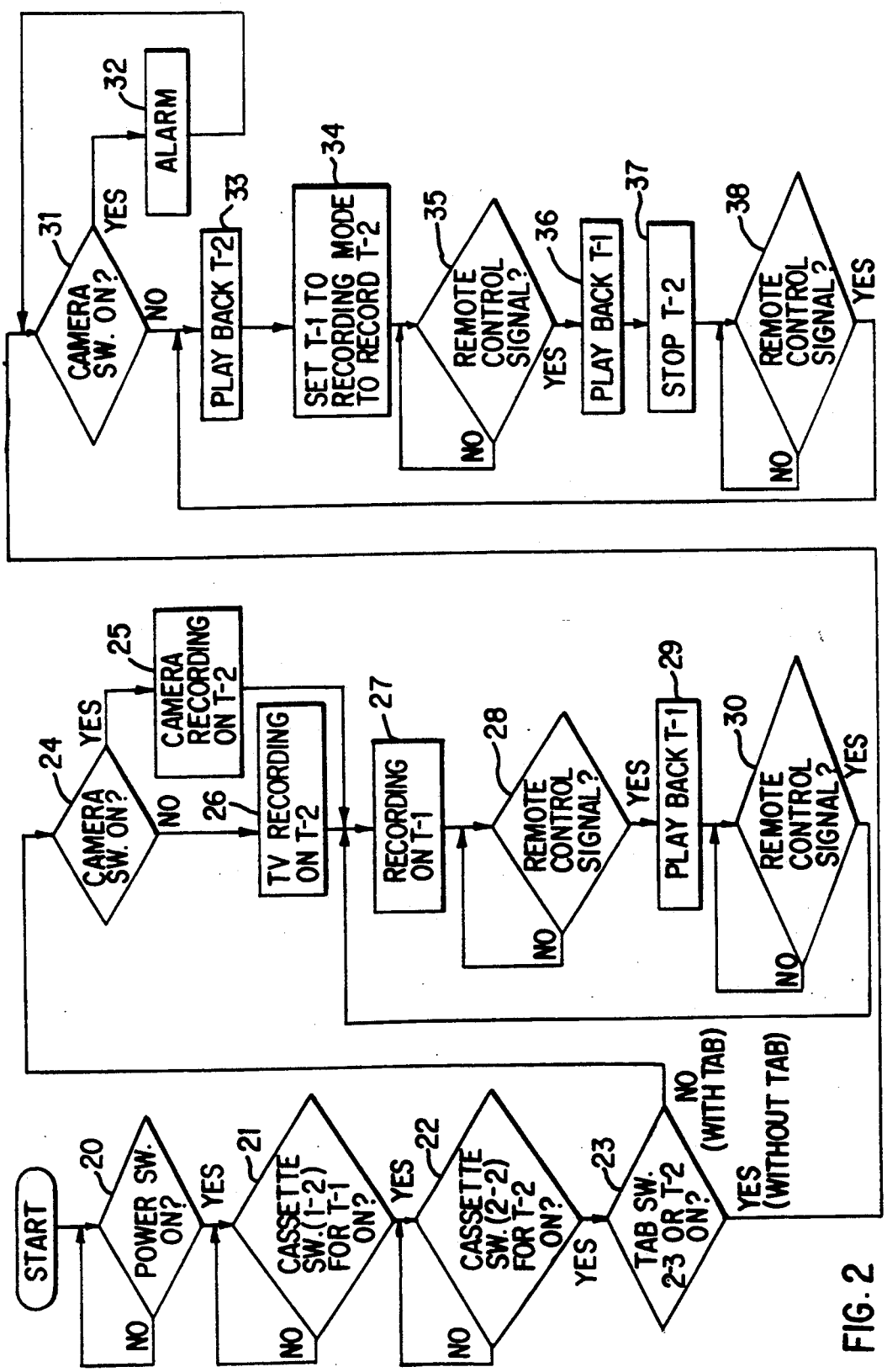
FIG. 2 is a flowchart showing an operation of the invention.

All the components of this device excluding the TV 3 are contained in one case. There now follows a description of a specific operation of the device with reference to the flowchart in FIG. 2.

First the power switch 7 is turned on; then the endless video tape T-1 (not shown) is inserted into the VCR (video cassette recorder) 1 and the standard video tape T-2 (not shown) into the VCR 2. With these operations, all steps 20, 21, 22, become YES, whereby the program advances to step 23, in which whether the record-prevention tabs are present is checked. If the tabs are present, the tab switch 2-3 is off to make the answer in step 23 negative, and thus the program advances to step 24. If the tabs are absent, the answer in step 23 is positive, and thus the program goes to step 31.

First, a case where a video tape T-2 with the tabs is inserted will be discussed. In this case, whether the camera switch 2-4 that is on when a camera (or a video movie not shown) is connected is checked in step 24. If the camera switch 2-4 is on, the program advances to step 25, in which the input terminal "IN" of the VCR 2 is set to the camera position by an electronic circuit (not shown), and at the same time, the VCR 2 is set to a recording mode in response to a command from the output port 0-2 to allow video information from the camera to be recorded on the standard video tape T-2. On the other hand, if no camera is connected and thus the camera switch 2-4 is off, the answer in step 24 is negative, so that the program goes to step 26. In step 26, the video information received by the TV 3 from a TV station is delivered from an output terminal "TV OUT", received by the input terminal "IN" of the VCR 2, and started to be recorded on the video tape T-2.

At the same time in step 27 the endless video tape T-1 (not shown) is set to the recording mode in response to a command from the output port 0-1, and the above-mentioned video signal either from the camera in step 25 or from the TV 3 in step 26 is recorded on the endless video tape T-1 of the VCR 1. That is, the output signal of the camera is applied to the output terminal "OUT" of the VCR 2 as a video signal, and this output video signal is received by an input terminal "VIDEO IN" of the TV 3 through the amplifier 5-1, analog switch 5-3 set as shown in the figure, and transistor 5-4 of the video switching circuit 5 and then displayed on the cathode-ray tube of the TV 3. The video signal displayed on the TV 3 is output for monitoring purposes from the output terminal "VIDEO OUT" and received by the input terminal "IN" of the VCR 1 so that the video signal can be recorded on the endless video tape T-1.

On the other hand, in the case where the video information from the TV station is to be recorded in step 26, a video signal from the output terminal "TV OUT" of the TV 3 is received by the input terminal "IN" of the VCR 2, which then starts recording the received signal on the video tape with tape ends T-2. Concurrently, with respect to the endless video tape T-1 in step 27, if no video signal is applied to the input terminal "VIDEO IN" of the TV 3, the video signal from the TV station is sent to the output terminal "VIDEO OUT" so that the VCR 1 starts recording this video signal on the endless video tape T-1.

In step 28, a remote control signal input is checked. That is, an operator watches the screen of the TV 3 and if he or she wishes to play back a particular portion of the video screen he or she watched, the remote control button 11-1 of the remote control box 11 is pressed once. This makes the answer in step 28 positive and causes the VCR 1 to be set to a playback mode in step 29. At the same time, the connection of the analog switch 5-3 is changed to the position opposite to that shown in the figure by a command from the output port 0-4 of the CPU 4. Thus when the desired video signal of the recorded video information is received by the input terminal "VIDEO IN" of the TV 3 through the output terminal "OUT", amplifier 5-2, analog switch 5-3, and transistor 5-4, the video information to be displayed on the cathode-ray tube of the TV 3 is automatically switched from that of the TV station to that of the endless video tape." If a television set used adopts a system of switching the video source between the TV station and the video tape either manually or by an infrared means, this switching operation may be interlocked with the remote control box 11. Since the video signal from the TV station is supplied from the output terminal "TV OUT" of the TV 3 during playback of the video tape T-1, the TV broadcast video signal can continuously be recorded on the video tape with tape ends T-2 of the VCR 2 with no influence from the playback of the video tape T-1.

When the playback operation of the endless video tape T-1 has been completed and the remote control button 11-1 of the remote control box 11 has been pressed once, the answer in step 30 becomes positive. This causes the operation to return back to the above step 27 and thereby switches the endless video tape T-1 to the recording mode.

When all the recording operations have been completed the power switch 7 is turned off and the operation of the flowchart is put to an end. Although the above-mentioned two video tapes are ejected whenever necessary, since this ejecting operation is not directly relevant to the invention, no mention thereof is made to the flowchart.

On the other hand, if the record-prevention tabs are found eliminated from the standard video tape T-2, the answer in step 23 is positive and the program advances to step 31. In step 31, whether the camera switch is turned on is checked in the same manner as in step 24. In this case, the video tape T-2 has already been recorded and no video recording can be made from the camera. Thus, if the camera is connected, the program goes to step 32 to drive the alarm device 8 by a command from the output port 0-3 of the CPU 4 and issue, e.g., and intermittent alarm sound. If the camera is disconnected, the answer in step 31 becomes negative and the program advances to step 33, in which the standard video tape T-2 is set to the playback mode by a command from the output port 0-2. The video signal that is played back is received by the input terminal "VIDEO IN" of the TV 3 from the output terminal "OUT" of the VCR 2 through the video switching circuit 5 (the analog switch 5-3 remains in the position shown in the figure) so that the video signal is started to be displayed on the cathode-ray tube. At the same time, the VCR 1 is set to the recording mode by a command from the output port 0-1 in step 34, and as a result, when a playback signal of the video tape T-2 is received by the TV 3 as described above this playback signal is output from the output terminal "VIDEO OUT" (monitor output) of the TV 3 and then received by the input terminal "IN" of the VCR 1, which starts recording the playback signal on the endless video tape T-1.

When the video information is played back from the video tape T-2 and the user wishes to watch a particular part of that video information repeatedly, the remote control button 11-1 of the remote control box 11 must be pressed once. A remote control signal thus generated is detected in step 35 and in response thereto, the VCR 1, i.e., the video tape T-1, is set to the playback mode by a command from the output port 0-1 in step 36. The playback signal thereby produced is received by the input terminal "VIDEO IN" of the TV 3 from the output terminal "OUT" of the VCR 1 through the amplifier 5-2, the analog switch 5-3 that is changed to the opposite position by a command from the output port 0-4, and transistor 5-4 so that the playback signal is started to be displayed on the cathode-ray tube of the TV 3. Simultaneously, in step 37, the video tape T-2 is made to stop its operation by a command from the output port 0-2 during the period in which the endless video tape T-1 is being played back.

After the playback of the video information on the endless video tape T-1 has been through, the remote control button 11-1 of the remote control box 11 is pressed once again. If a remote control signal is detected in step 38, the operation returns to step 33 to start playing back the standard video tape T-2 again. The endless video tape T-1 is also switched to the recording mode to start recording the playback signal of the tape T-2 (steps 34, 35). In order to complete these operations either the power switch 7 is turned off or the two tapes are ejected as previously described.

The device according to this invention may not only be used for learning; it may also be applied to "dubbing" which, in this invention, only involves installation of both a commercially available tape with tape ends contained in a cassette with record-prevention tabs to the T-1 side and a commercially available video cassette tape, or the so-called "master tape", to the T-2 side.

As described in the foregoing pages, this invention incorporates three independently purchased components, two video tapes and one television set into a single set and allows the set of components to be operated by a single remote control box. The invention also enables automatic operation of a cassette tape for recording with tabs and that without tabs. Hence, the invention provides an enormous practical advantage for allowing the user to make substantial progress in a field of learning by the use of an endless video tape.

What is claimed is:

1. An audio-visual apparatus for a VCR-based video tape, comprising:

means for recording or reproducing information to or from a T-1 tape and a T-2 tape. wherein T-1 is an endless video tape and T-2 is a standard video tape having tape ends;

means for detecting whether T-2 has record-prevention tabs installed thereon;

a remote control unit for sending a control signal each time a switch on said unit is manually operated; and means responsive to record-prevention tabs detected on T-2 for
(a) operating said apparatus in a first mode wherein T-1 and T-2 both are set to recording operation when operating power from a power source is applied to said apparatus,
(b) operating said apparatus in a second mode wherein T-1 is set to playback operation and T-2 is maintained in recording operation in response to a first receipt of said control signal, and
(c) operating said apparatus in the first mode in response to a second receipt of said control signal.

2. An audio-visual apparatus for a VCR-based video tape, comprising:
means for recording or reproducing information to or from a T-1 tape and a T-2 tape, wherein T-1 is an endless video tape and T-2 is a standard video tape having tape ends;
a remote control unit for sending a control signal each time a switch on said unit is manually operated;
means for operating the apparatus in a first mode wherein T-1 is set to recording and T-2 is set to playback for dubbing when operating power from a power source is applied to said apparatus;
means responsive to a first receipt of said control signal for operating the apparatus in a second mode wherein T-1 is set to playback and T-2 is stopped; and
means responsive to a second receipt of said control signal for operating the apparatus in said first mode.

3. An audio-visual apparatus for a VCR-based video tape, comprising:
means for recording or reproducing information to or from a T-1 tape and a T-2 tape, wherein T-1 is an endless video tape and T-2 is a standard video tape having tape ends;
means for detecting whether T-2 has record-prevention tabs installed thereon;
a remote control unit for sending a control signal each time a switch on said unit is manually operated; and
means responsive to record-prevention tabs detected on T-2 for
(a) operating said apparatus in a first mode wherein T-1 and T-2 both are set to recording operation when operating power from a power source is applied to said apparatus,
(b) operating said apparatus in a second mode wherein T-1 is set to playback operation and T-2 is maintained in recording operation in response to a first receipt of said control signal, and
(c) operating said apparatus in the first mode in response to a second receipt of said control signal; and means responsive to record prevention tabs not detected on T-2 for
(a) operating said apparatus in a first mode wherein T-1 is set to recording and T-2 is set to playback for dubbing when operating power is applied to said apparatus;
(b) operating said apparatus in a second mode wherein T-1 is set to playback and T-2 is stopped in response to a first receipt of said control signal, and
(c) operating said apparatus in the first mode in response to a second receipt of said control signal.

4. A method of operating an audio-visual apparatus for a VCR-based video tape, comprising means for recording or reproducing information to or from a T-1 tape and a T-2 tape, wherein T-1 is an endless video tape and T-2 is a standard video tape having tape ends, and a remote control unit for sending a control signal each time a switch thereon is manually operated, the method comprising the steps of:
(1) detecting whether T-2 has record-prevention tabs thereon;
(2) if record-prevention tabs are detected in step (1)
(a) operating said apparatus in a first mode wherein T-1 and T-2 both are set to recording operation when operating power from a power source is applied to said apparatus,
(b) operating said apparatus in a second mode wherein T-1 is set to playback operation and T-2 is maintained in recording operation in response to a first receipt of said control signal;
(c) operating said apparatus in the first mode in response to a second receipt of said control signal; and
(3) if record-prevention tabs are not detected in step (1)
(a) operating said apparatus in a first mode wherein T-1 is set to recording and T-2 is set to playback for dubbing when operating power from a power source is applied to said apparatus;
(b) operating said apparatus in a second mode wherein T-1 is set to playback and T-2 is stopped in response to a first receipt of said control signal, and
(c) operating said apparatus in the first mode in response to a second receipt of said control signal.

5. A method of operating an audio-visual apparatus for a VCR-based video tape, comprising means for recording or reproducing information to or from a T-1 tape and a T-2 tape, wherein T-1 is an endless video tape and T-2 is a standard video tape having tape ends, and a remote control unit for sending a control signal each time a switch thereon is manually operated, the method comprising the steps of:
operating said apparatus in a first mode wherein T-1 and T-2 both are set to recording operation when operating power from a power source is applied to said apparatus;
operating said apparatus in a second mode wherein T-1 is set to playback operation and T-2 is maintained in recording operation in response to a first receipt of said control signal; and
operating said apparatus in the first mode in response to a second receipt of said control signal.

* * * * *